(12) United States Patent
Choi et al.

(10) Patent No.: US 9,682,433 B2
(45) Date of Patent: Jun. 20, 2017

(54) CUTTING INSERT AND MILLING CUTTER INCLUDING SAME

(71) Applicant: TAEGUTEC, LTD., Dalseong-gun, Daegu (KR)

(72) Inventors: Chang Hee Choi, Daegu (KR); Su Jin Ryu, Daegu (KR)

(73) Assignee: TAEGUTEC LTD., Dalseoung-gun, Daegu (KR)

(*) Notice: Subject to any disclaimer, the term of this patent is extended or adjusted under 35 U.S.C. 154(b) by 246 days.

(21) Appl. No.: 14/653,173

(22) PCT Filed: Dec. 20, 2013

(86) PCT No.: PCT/KR2013/011968
§ 371 (c)(1),
(2) Date: Jun. 17, 2015

(87) PCT Pub. No.: WO2014/104667
PCT Pub. Date: Jul. 3, 2014

(65) Prior Publication Data
US 2015/0336187 A1 Nov. 26, 2015

(30) Foreign Application Priority Data

Dec. 24, 2012 (KR) .................. 10-2012-0152217

(51) Int. Cl.
*B23C 5/06* (2006.01)
*B23C 5/22* (2006.01)

(52) U.S. Cl.
CPC .............. *B23C 5/06* (2013.01); *B23C 5/2221* (2013.01); *B23C 2200/0433* (2013.01);
(Continued)

(58) Field of Classification Search
CPC . B23C 5/06; B23C 2200/16; B23C 2200/161; B23C 2200/164;
(Continued)

(56) References Cited

U.S. PATENT DOCUMENTS 5,542,795 A 8/1996 Mitchell
5,924,826 A 7/1999 Byström et al.
(Continued)

FOREIGN PATENT DOCUMENTS

WO WO 2010-067910 A1 6/2010

OTHER PUBLICATIONS

Office Action dated Apr. 1, 2016, issued in Chinese counterpart application (No. 201380066180.7).
(Continued)

*Primary Examiner* — Will Fridie, Jr.
(74) *Attorney, Agent, or Firm* — Womble Carlyle

(57) ABSTRACT

A cutting insert mountable in an insert pocket of a milling cutter and capable of effectively absorbing a radially outward force during high speed machining and high ramp machining. The cutting insert has a top surface, a bottom surface, peripheral surfaces extending between the top and bottom surfaces, a mounting hole extending through the top surface and the bottom surface, a protrusion portion protruding from the bottom surface, and a pair of lower inclined abutment surfaces formed at opposite edges of the bottom surface. The lower inclined abutment surfaces are inclined in opposite directions toward a pair of opposing peripheral surfaces, outwardly and upwardly relative to the protrusion portion. The protrusion portion extends across the mounting hole and has a lateral surface facing radially outwardly of the milling cutter. The lateral surface selectively contacts or does not contact the insert pocket depending on a revolution speed of the milling cutter.

20 Claims, 6 Drawing Sheets

(52) U.S. Cl.
CPC .. *B23C 2200/161* (2013.01); *B23C 2200/164* (2013.01); *B23C 2200/168* (2013.01); *B23C 2210/168* (2013.01); *Y10T 407/1936* (2015.01); *Y10T 407/23* (2015.01)

(58) Field of Classification Search
CPC ........ B23C 2200/165; B23C 2200/168; B23C 2200/0433
See application file for complete search history.

(56) References Cited

U.S. PATENT DOCUMENTS

| | | | |
|---|---|---|---|
| 5,931,613 A | 8/1999 | Larsson | |
| 7,476,061 B2 | 1/2009 | Edler | |
| 7,549,358 B2 | 6/2009 | Pantzar | |
| 8,596,933 B2 | 12/2013 | Ryu | |
| 9,108,254 B2 | 8/2015 | Lee | |
| 2002/0037199 A1* | 3/2002 | Satran | B23C 5/1045 407/54 |
| 2003/0017014 A1* | 1/2003 | Morgulis | B23C 5/109 407/34 |
| 2006/0056928 A1* | 3/2006 | Riviere | B23C 5/1045 407/113 |
| 2008/0095586 A1 | 4/2008 | Satran et al. | |
| 2008/0166191 A1* | 7/2008 | Andersson | B23C 5/2208 407/103 |
| 2009/0169313 A1* | 7/2009 | Satran | B23C 5/109 407/40 |
| 2010/0003090 A1* | 1/2010 | Johansson | B23C 5/202 407/113 |
| 2010/0150670 A1* | 6/2010 | Hecht | B23C 5/109 407/40 |
| 2011/0236143 A1* | 9/2011 | Ryu | B23C 5/2221 407/103 |
| 2013/0330136 A1* | 12/2013 | Hecht | B23C 5/2221 407/113 |
| 2014/0010607 A1* | 1/2014 | Wandeback | B23F 21/128 407/113 |
| 2014/0369773 A1* | 12/2014 | Waggle | B23C 5/003 407/54 |
| 2015/0158090 A1* | 6/2015 | Hecht | B23B 27/16 407/113 |
| 2016/0288225 A1* | 10/2016 | Lee | B23C 5/109 |

OTHER PUBLICATIONS

International Search Report dated Mar. 26, 2014 issued in PCT counterpart application (No. PCT/KR2013/011968).
Extended European Search Report dated Aug. 18, 2016 issued in counterpart European application (No. 13869494.8).

* cited by examiner

US 9,682,433 B2

CUTTING INSERT AND MILLING CUTTER INCLUDING SAME

RELATED APPLICATIONS

This is a 35 USC 371 U.S. National Phase of International Application No. PCT/KR2013/011968, filed 2013 Dec. 20 and published as WO 2014/104667A1 on 2014 Jul. 2003, which claims priority to Korean application no. 10-2012-0152217, filed 2012 Dec. 24. The contents of the aforementioned applications are incorporated by reference in their entirety.

TECHNICAL FIELD

The present invention relates to a cutting insert for use in a high speed machining and a high ramp machining. Further, the present invention also relates to a milling cutter including such a cutting insert.

BACKGROUND ART

In high speed and high ramp machinings, a radially outward force is applied to a cutting insert, which is mounted in a milling cutter, due to a centrifugal force and a radially outward cutting force. Such a radially outward force acts to push the cutting insert from an insert pocket of the milling cutter radially outwardly of the insert pocket, thus restricting a cutting edge feed and a depth of cut. Further, said radially outward force minutely displaces the cutting insert in a radially outward direction, thereby leading to the breakage of a clamping screw for securing the cutting insert to the insert pocket and the separation of the cutting insert from the milling cutter. As such, the failure of firmly retaining the cutting insert in the insert pocket of the milling cutter during the high speed machining and high ramp machining may lead to the breakage of the clamping screw, the separation of the cutting insert, and the damages of the milling cutter and workpieces. In particular, if the cutting insert is not firmly retained when machining the workpieces such as aircraft parts at a high speed, then the workpieces cannot be precisely machined.

As to the retention between the cutting insert and the insert pocket, U.S. Pat. No. 5,542,795 proposes a milling cutter wherein a rail of a cutting insert is fitted to a slot of an insert pocket. According to this document, the cutting insert is mounted to the milling cutter such that the rail protruding from a bottom surface of the cutting insert is fitted to the slot formed in a base wall of the insert pocket. If the cutting insert is mounted in the insert pocket, then a peripheral surface of the cutting insert, which does not face toward a workpiece, contacts a side wall of the insert pocket and the bottom surface of the cutting insert contacts the base wall of the insert pocket. Further, a flat bottom surface of the rail contacts a flat bottom surface of the slot.

In the aforementioned prior art milling cutter, to mount the cutting insert in the insert pocket, the bottom surface of the rail and the peripheral surface and the bottom surface of the cutting insert must come into contact with the bottom surface of the slot and the side wall and the base wall of the insert pocket, respectively. To accomplish such contact, the cutting insert and the insert pocket require strict tolerance maintenance and high precision. This does not facilitate the manufacture of a cutting insert and a milling cutter, which are stably usable in a high speed machining as well as a high ramp machining.

DISCLOSURE OF INVENTION

Technical Problem

The present invention is directed to solving the aforementioned problems of the prior art. The present invention provides a cutting insert, which has a simple structure for easy manufacture and is capable of effectively absorbing a radially outward force during a high speed machining and a high ramp machining. The present invention further provides a milling cutter including such a cutting insert.

Solution to Problem

One aspect of the present invention provides a cutting insert mountable in an insert pocket of a milling cutter. In one exemplary embodiment, the cutting insert comprises: a top surface; a bottom surface; a plurality of peripheral surfaces extending between the top surface and the bottom surface; a mounting hole extending through the top surface and the bottom surface; a plurality of cutting edges formed at intersections between the top surface and the peripheral surfaces; a protrusion portion protruding from the bottom surface and extending across the mounting hole; and a pair of lower inclined surfaces inclined outwardly upwardly and provided at an edge of the bottom surface facing to the protrusion portion respectively.

In an embodiment, the cutting insert is mounted in an insert pocket of a milling cutter. The protrusion portion has a lateral surface facing radially outwardly of the milling cutter. The lateral surface of the protrusion portion selectively contacts or does not contact the insert pocket depending upon a revolution speed of the milling cutter.

In an embodiment, the plurality of cutting edges comprises a pair of major cutting edges provided in a longitudinal direction of the cutting insert and a pair of minor cutting edges provided in a lateral direction of the cutting insert between the major cutting edges. The major cutting edge is longer than the minor cutting edge. Further, when viewing the cutting insert from top, the major cutting edge and the minor cutting edge adjoin each other with an interior angle of 110 degrees to 130 degrees.

In an embodiment, the protrusion portion has a shape rotationally symmetrical about a central axis of the mounting hole by 180 degrees.

In an embodiment, the protrusion portion comprises a pair of protrusions separated by the mounting hole. The protrusion comprises a pair of lateral surfaces each facing toward the lower inclined surface and a flat bottom surface located at bottom ends of the lateral surfaces of the protrusion.

In an embodiment, the lateral surface of the protrusion has a slope of 0 degree to 15 degrees relative to a direction perpendicular to the bottom surface of the protrusion. When the slope of the lateral surface of the protrusion is 0 degree, the protrusion has a width of ⅓ of a width of the top surface of the cutting insert.

In an embodiment, the lateral surface of the protrusion has a bottom edge chamfered to a beveled or rounded surface.

In an embodiment, the pair of the protrusions extend in a longitudinal direction of the cutting insert or at an angle to the longitudinal direction of the cutting insert.

In an embodiment, the pair of the protrusions extend in a wavy shape.

In an embodiment, the lower inclined surface has a slope of 10 degrees to 30 degrees relative to the bottom surface of the protrusion.

A further aspect of the present invention provides a milling cutter. In one exemplary embodiment, the milling cutter comprises a cutter body having a plurality of insert pockets for mounting the cutting insert according to the embodiments. The insert pocket comprises: two side walls supporting adjacent two peripheral surfaces of the cutting insert; a base wall having an inclined wall located radially outwardly of the insert pocket and protruding slantingly; a recess portion recessed in the base wall and receiving the protrusion portion protruding from the bottom surface of the cutting insert; and a threaded hole located in the recess portion. The inclined wall of the base wall supports one of the pair of the lower inclined surfaces of the bottom surface of the cutting insert and said one of the pair of the lower inclined surfaces is located radially outwardly.

In an embodiment, the recess portion receives the protrusion portion of the cutting insert with a gap such that the protrusion portion does not contact the recess portion. As a revolution speed of the cutter body increases, the protrusion portion comes into contact with and is supported by a side wall of the recess portion, which is located radially outwardly of the insert pocket.

In an embodiment, the inclined wall of the base wall is inclined relative to the base wall at the same slope as that of the lower inclined surface of the cutting insert.

Advantageous Effects of Invention

According to the cutting insert and the milling cutter including the cutting insert according to the embodiments, the cutting insert is stably mounted in the insert pocket of the milling cutter, thus avoiding the separation of the cutting insert from the insert pocket of the milling cutter during a cutting machining, particularly, a high speed machining and a high ramp machining. The protrusion portion provided in the bottom surface of the cutting insert is received in the recess portion of the insert pocket without binding, thus relieving the requirement of the strict tolerance maintenance and the high precision in manufacturing the cutting insert and the milling cutter. This achieves the easy manufacture of the cutting insert and the milling cutter usable in the high speed machining and the high ramp machining with a simple structure.

The lower inclined surface provided in the bottom surface of the cutting insert contacts and is supported by the inclined wall located radially outwardly in the base wall of the insert pocket. Thus, the inclined wall of the insert pocket receives the radially outward cutting force and the centrifugal force, reducing stress to a clamping screw and preventing its breakage. Further, as the radially outward force, which is applied to the cutting insert due to the radially outward cutting force or the centrifugal force, increases along with the increase in the revolution speed of the milling cutter, the protrusion portion, which is received in the recess portion with non-contact therebetween, may be pushed toward the side wall of the recess portion and then come into contact with the side wall of the recess portion. Thus, the cutting insert can effectively absorb the radially outward force applied by the centrifugal force during an ultra-high speed machining. Accordingly, the cutting insert can be stably retained in the milling cutter during a high speed machining and a high ramp machining and the breakage of the clamping screw can be avoided. Further, the service lives of the cutting insert and the milling cutter can be increased and the workpiece can be precisely machined.

MODE FOR THE INVENTION

Figure 1:
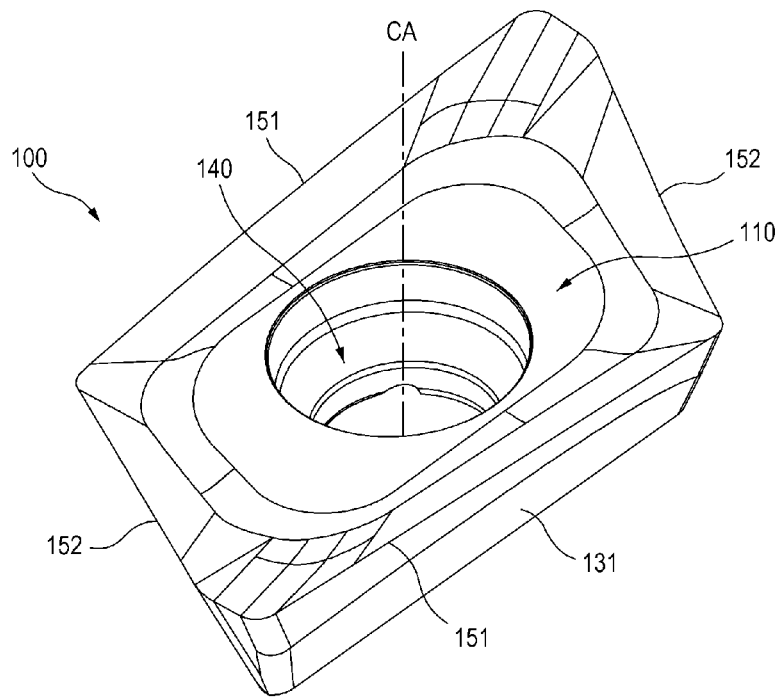
FIG. 1 is a perspective view showing a top surface of a cutting insert according to an embodiment.

Embodiments of a cutting insert according to the present invention and embodiments of a milling cutter including such a cutting insert according to the present invention will now be described with reference to the accompanying drawings. Like reference numerals in the drawings refer to like elements or parts.

A cutting insert 100 according to an embodiment, which is shown in FIGS. 1 to 8, is mounted in an insert pocket of a milling cutter according to an embodiment and may be used for a general milling operation, a high speed milling operation, a high ramp milling operation, etc. The cutting insert 100 may be made from cemented carbide alloy by pressure molding.

Referring to FIGS. 1 to 4, the cutting insert 100 includes a top surface 110, a bottom surface 120, a plurality of peripheral surfaces 131, 132 between the top surface 110 and the bottom surface 120, and a mounting hole 140 extending through the top surface 110 and the bottom surface 120.

The top surface 110 and the bottom surface 120 are opposed in the cutting insert 100. The plurality of peripheral surfaces 131, 132 extend between the top surface 110 and the bottom surface 120 and interconnect the top and bottom surfaces 110, 120. The peripheral surfaces 131, 132 have a width decreasing toward the bottom surface 120. In one embodiment, the peripheral surfaces may have a constant width. The cutting insert includes a plurality of cutting edges 151, 152 at intersections between the top surface 110 and the peripheral surfaces 131, 132. The cutting insert 100 according to an embodiment is a single-sided cutting insert wherein the cutting edges 151, 152 are defined at the intersections between the top surface 110 and the peripheral surfaces 131, 132.

In this embodiment, the top surface 110 has an approximately rectangular shape with four edges. Thus, the cutting insert 100 includes four cutting edges 151, 152 at the intersections between the four edges of the top surface 110 and the four peripheral surfaces 131, 132. Said four cutting edges 151, 152 comprises a pair of main cutting edges 151 and a pair of minor cutting edges 152. The main cutting edges 151 are located along a longitudinal direction (e.g., the X-axis direction in FIG. 4) of the cutting insert 100. The minor cutting edges 152 are located between the main cutting edges 151 along a lateral direction (e.g., the Y-axis direction in FIG. 4) of the cutting insert 100. The main cutting edges 151 are longer than the minor cutting edges 152. The milling cutter with the cutting insert 100 according to an embodiment may be used for various milling machining such as straight ramping, helical ramping, step milling, depending on the rotation or feed manner of the cutting insert 100 for a workpiece. In the aforementioned machining, the main cutting edge 151 is positioned approximately vertically to the cut surface of the workpiece, while the minor cutting edge 152 is positioned approximately horizontally to the cut surface of the workpiece. Thus, the main cutting edge 151 cuts the workpiece as the milling cutter is moved in a horizontal direction while being rotated. Further, the minor cutting edge 152 cuts the workpiece as the milling cutter is moved in a vertical or inclined direction. Further, a corner portion of the cutting insert, at which the main cutting edge 151 and the minor cutting edge 152 adjoin each other, may cut the workpiece.

Figure 4:
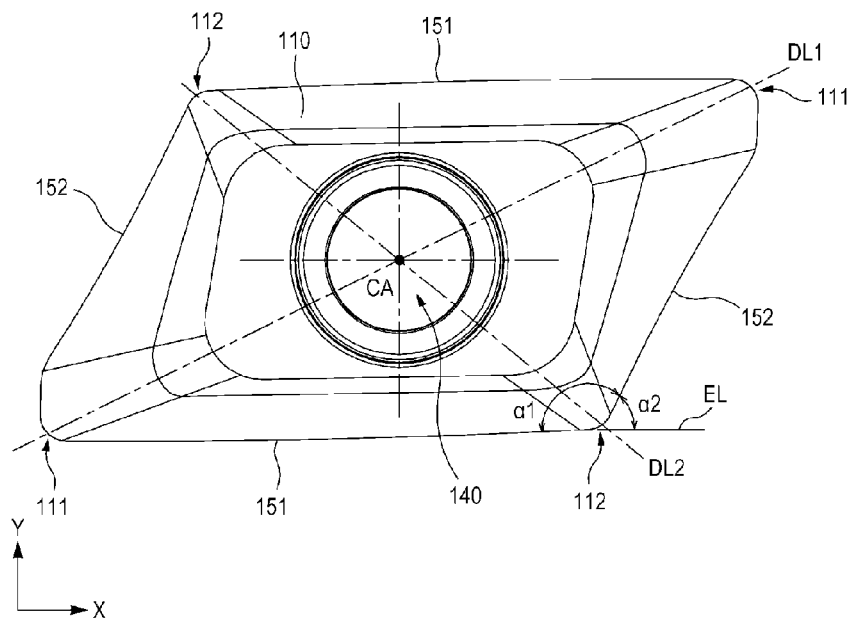
FIG. 4 is a top view of a cutting insert according to an embodiment.

Referring to FIG. 4, when viewing the cutting insert 100 from top, the main cutting edge 151 and the minor cutting edge 152 of the cutting insert 100 adjoin each other at an interior angle α1 of 110 degrees to 130 degrees. That is, the minor cutting edge 152 adjoins the main cutting edge 151 at an exterior angle α2 of 50 degrees to 70 degrees relative to an extension line EL from the main cutting edge 151. The cutting insert 100 according to an embodiment, the top surface 110 of which has the above-described shape, may be used as a positive type cutting insert capable of reducing cutting resistance and allowing better chip creation.

When assuming an imaginary diagonal line DL1 extending through two opposing corners of the top surface 110 and another imaginary diagonal line DL2 extending through another two opposing corners of the top surface 110, corner portions 111, which lie on the longer diagonal line DL1, are higher than corner portions 112, which lie on the shorter diagonal line DL2. That is, the top surface 110 comprises a smoothly curved surface such that both corner portions 111 opposed in the longer diagonal line DL1 are higher than the rest corner portions 112.

Figure 2:
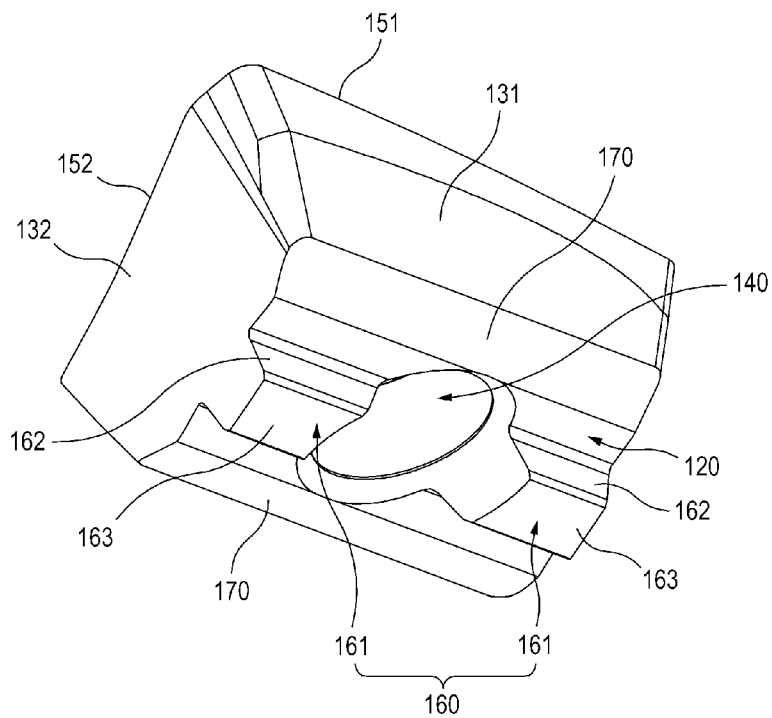
FIG. 2 is a perspective view showing a bottom surface of a cutting insert according to an embodiment.
Figure 3:
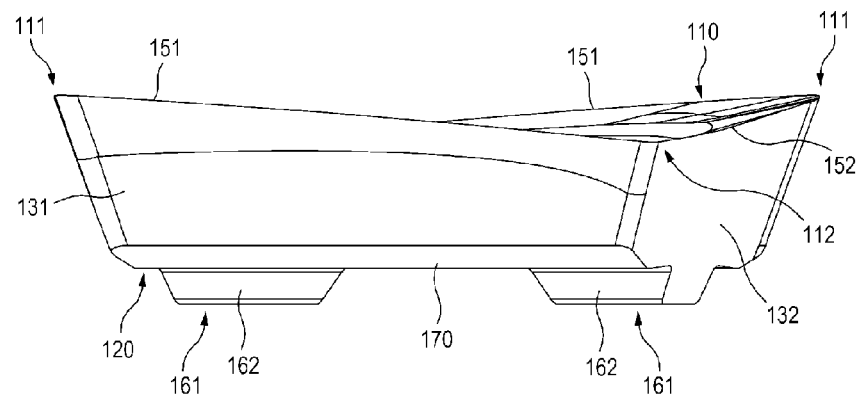
FIG. 3 is a side view of a cutting insert according to an embodiment in its longitudinal direction.

Referring to FIGS. 2 and 3, the cutting insert 100 includes a protrusion portion 160 protruding from the bottom surface 120 and a pair of lower inclined surfaces 170 at the intersections between the bottom surface 120 and the peripheral surfaces 131. The protrusion portion 160 extends in the longitudinal direction of the cutting insert 100 across the mounting hole 140. The lower inclined surfaces 170 are formed at the intersections between the bottom surface 120 and the peripheral surfaces 131 in the lateral direction of the cutting insert 100, respectively.

The protrusion portion 160 has a shape that is rotationally symmetrical when rotating the cutting insert 100 about the central axis CA of the mounting hole 140 (see FIG. 1) by 180 degrees. In this embodiment, the protrusion portion 160 comprises a pair of protrusions 161 that are separated by the mounting hole 140. The pair of protrusions 161 protrude along the longitudinal direction of the cutting insert 100 beside the mounting hole 140 respectively. The protrusions 161 may have an approximate hexahedron shape.

Figure 5:
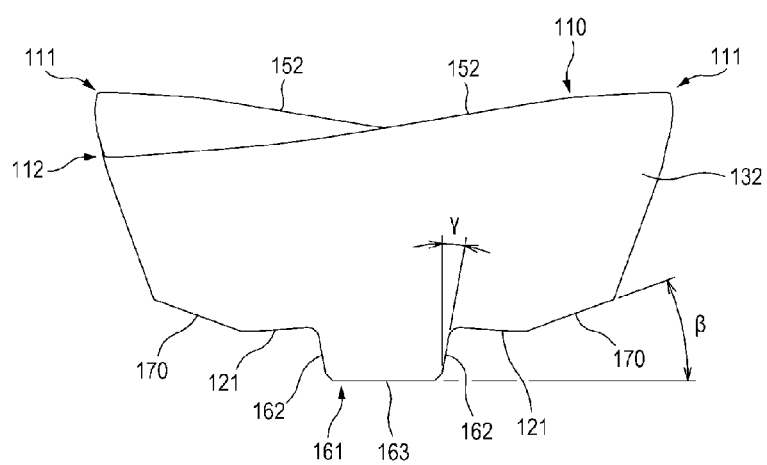
FIG. 5 is a side view of a cutting insert according to an embodiment in its lateral direction.

Referring to FIGS. 2, 3 and 5, the protrusion 161 includes a pair of lateral surfaces 162 and a flat bottom surface 163 located at bottom ends of the lateral surfaces 162. The pair of lateral surfaces 162 of the protrusion 161 face toward the pair of lower inclined surfaces 170 respectively. The lateral surfaces 162 of the protrusion 161 have a slope γ of 0 degree to 15 degrees relative to a direction perpendicular to the flat bottom surface 163 of the protrusion 161. Bottom edges of the protrusion 161, at which the lateral surfaces 162 and the bottom surface 163 meet, are chamfered to a beveled or rounded surface. This prevents not only the stress concentration on the bottom edges of the protrusion 161, but also cracks to be made during manufacturing the cutting insert 100. In a high speed machining and a high ramp machining, the lateral surface 162 of the protrusion 161 may be pushed toward the insert pocket of the milling cutter and then come into contact with the insert pocket.

If the slope γ exceeds 15 degrees, then the protrusion 161 may slip on a surface at which the protrusion 161 contacts the insert pocket of the milling cutter although the lateral surface 162 of the protrusion 161 is in contact with the insert pocket of the milling cutter. Then, the cutting insert 100 is not stably retained in the insert pocket of the milling cutter and thus can be separated from the insert pocket. Thus, the cutting insert 100 according to an embodiment can be used for the high speed machining and the high ramp machining by adjusting the slope γ of the lateral surface 162 of the protrusion 161.

Figure 6:
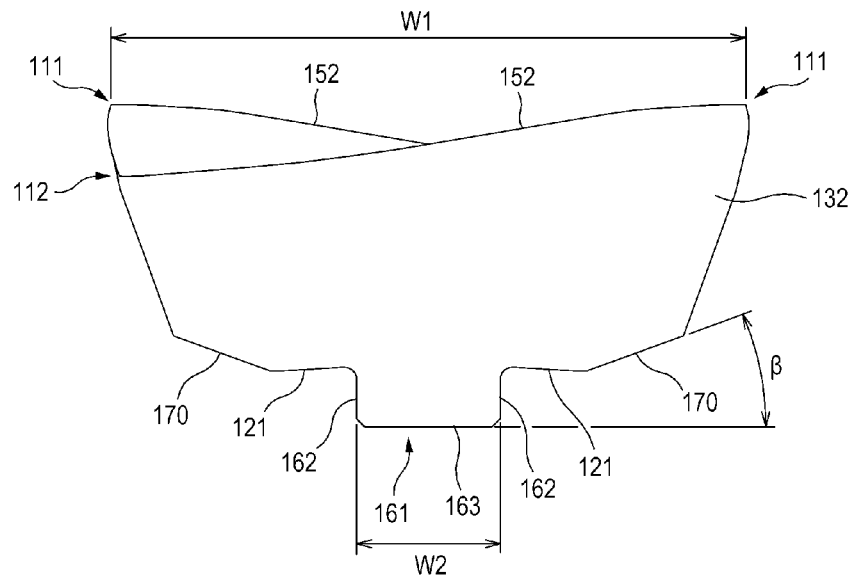
FIG. 6 is a side view similar to FIG. 5, showing another example of a protrusion portion.

Reference is made to FIG. 6, which shows that the slope γ of the lateral surface 162 of the protrusion 161 is 0 degree. As shown in FIG. 6, the protrusion 161 has a width W2 of ⅓ of a width W1 of the top surface 110. Said width W2 of the protrusion 161 means the shortest distance between the pair of the lateral surfaces 162. If the width W2 of the protrusion 161 is less than ⅓ of the width W1 of the top surface 110, then the protrusion 161 fails to sufficiently absorb the radially outward force applied to the cutting insert 100 by the radially outward cutting force and the centrifugal force during the high speed machining and the high ramp machining. If the width W2 of the protrusion 161 is greater than ⅓ of the width W1 of the top surface 110, then the volume and weight of the cutting insert 100 excessively increase.

The protrusion height of the protrusion 161 may vary depending on the recessed depth of a recess portion provided in the insert pocket of the milling cutter (this will be described below). In this embodiment, the protrusion height of the protrusion 161 is less than the recessed depth of the recess portion. Thus, when the cutting insert 100 is mounted in the insert pocket, the bottom surface 163 of the protrusion 161 does not contact the insert pocket (see FIG. 12). That is, the protrusion 161 is shaped and sized such that it can be received in the recess portion with clearance. Accordingly, the cutting insert 100 does not require strict tolerance maintenance and high precision and thus can be easily manufactured.

The pair of the lower inclined surfaces 170 are inclined outwardly upwardly respectively. The pair of the lower inclined surfaces 170 have a slope β of 10 degrees to 30 degrees relative to the flat bottom surface 163 of the protrusion 161. The cutting insert 100 is seated in the insert pocket of the milling cutter at the lower inclined surface 170. The bottom surface 120 of the cutting insert 100 adjacent to the lower inclined surface 170, that is a portion 121 of the bottom surface 120 between the lower inclined surface 170 and the protrusion 161 does not contact the insert pocket. Thus, the cutting insert 100 is supported by the insert pocket through contact between the lower inclined surface 170 and the insert pocket. If the slope β of the lower inclined surface 170 is less than 10 degrees, then the cutting insert 100 is not firmly supported by the insert pocket due to the radially outward force applied to the cutting insert by the centrifugal force and the radially outward cutting force during the high speed machining and the high ramp machining and may be pushed outwardly. If the slope β of the lower inclined surface 170 is greater than 30 degrees, then the peripheral surfaces 131 of the cutting insert 100 are reduced relatively and the peripheral surfaces 131 fail to contact the side wall of the insert pocket to the sufficient extent. Thus, the cutting insert 100 according to an embodiment can be used for the high speed machining and the high ramp machining by adjusting the slope β of the lower inclined surface 170 considering the intensity of the force applied to the cutting insert 100.

Figure 7:
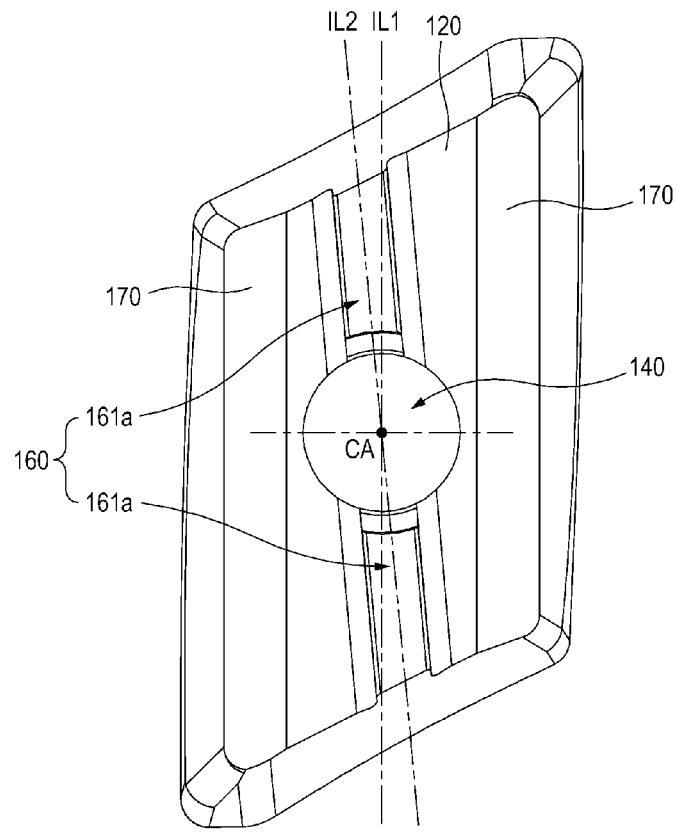
FIG. 7 is a bottom view of a cutting insert according to an embodiment, showing another example of a protrusion portion.
Figure 8:
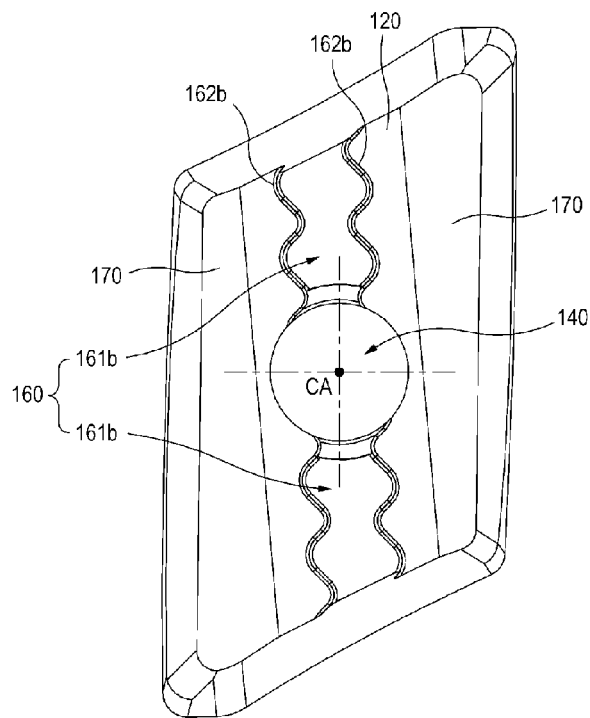
FIG. 8 is a bottom view of a cutting insert according to an embodiment, showing still another example of a protrusion portion.

The protrusion 161 of the protrusion portion 160 according to the above-described example protrudes from the bottom surface 120 of the cutting insert 100 and extends in the longitudinal direction of the cutting insert 100. FIGS. 7 and 8 show another example of the protrusion respectively. The protrusion 161a of the protrusion portion 160 shown in FIG. 7 extends in an imaginary line IL2, which is inclined at a predetermined angle to an imaginary line IL1 extending in the longitudinal direction of the cutting insert. Thus, the cutting insert 100 can be positioned in the insert pocket of the milling cutter at various angles relative to the cut surface of a workpiece, thus variously changing the processing depth of the cutting insert 100 for the workpiece. The protrusion 161b of the protrusion portion 160 shown in FIG. 8 extends in a wavy shape in the longitudinal direction of the cutting insert 100 or in a direction inclined at a predetermined angle to the longitudinal direction. Thus, the lateral surface 162b of the protrusion 161b comprises a curved surface. This increases the contact area between the protrusion 161b and the recess portion of the insert pocket as well as the absorption of the radially outward force applied to the cutting insert 100 by the radially outward cutting force and the centrifugal force during the high speed machining and the high ramp machining.

Figure 9:
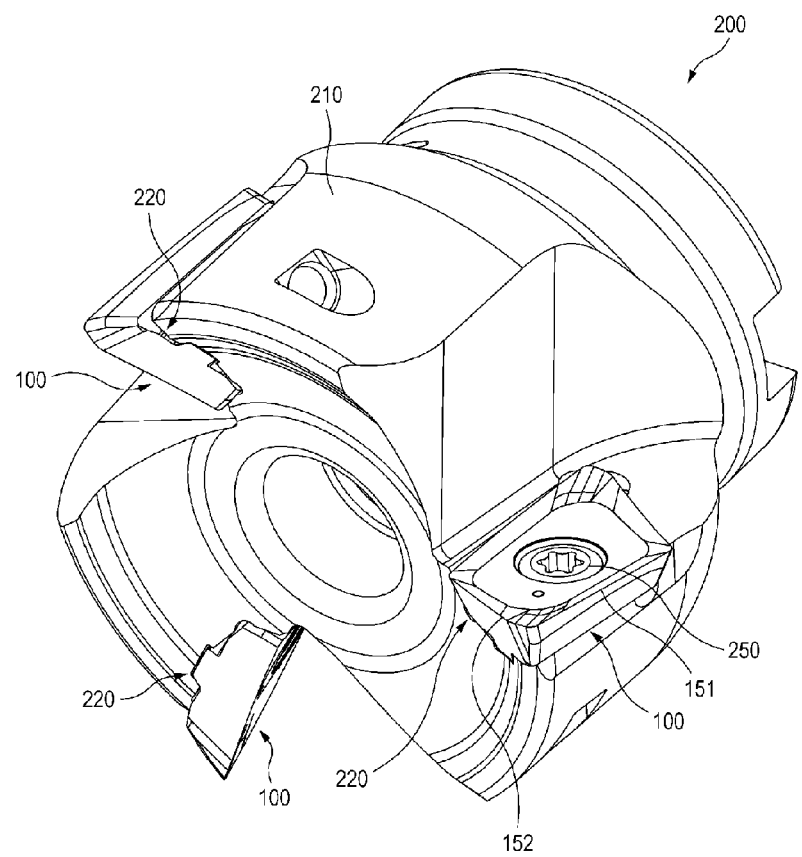
FIG. 9 is a perspective view showing a milling cutter according to an embodiment.
Figure 10:
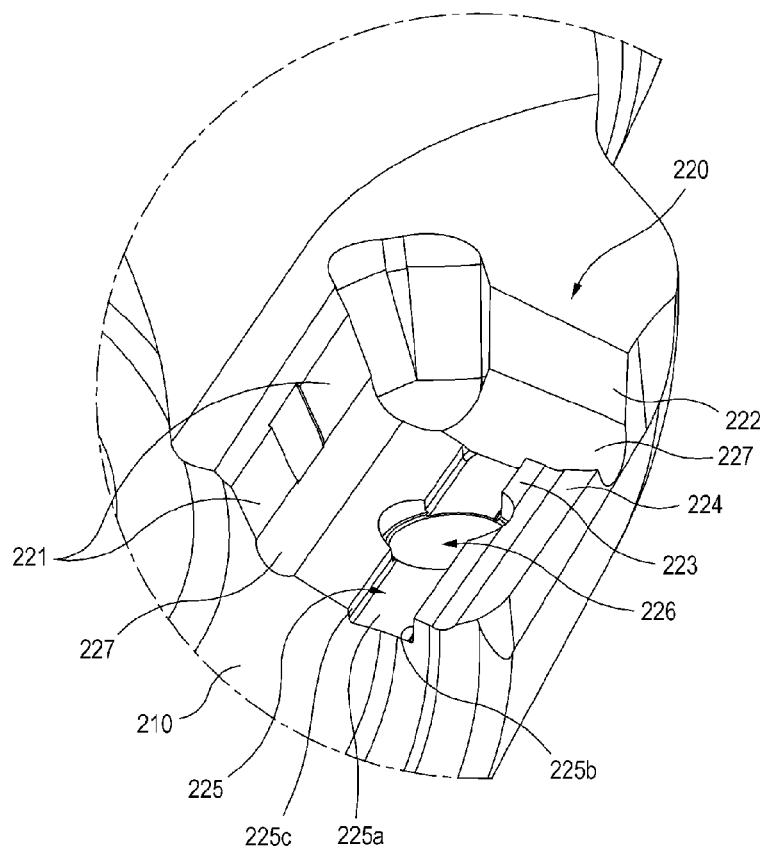
FIG. 10 is a perspective view showing an insert pocket provided in a milling cutter according to an embodiment.
Figure 11:
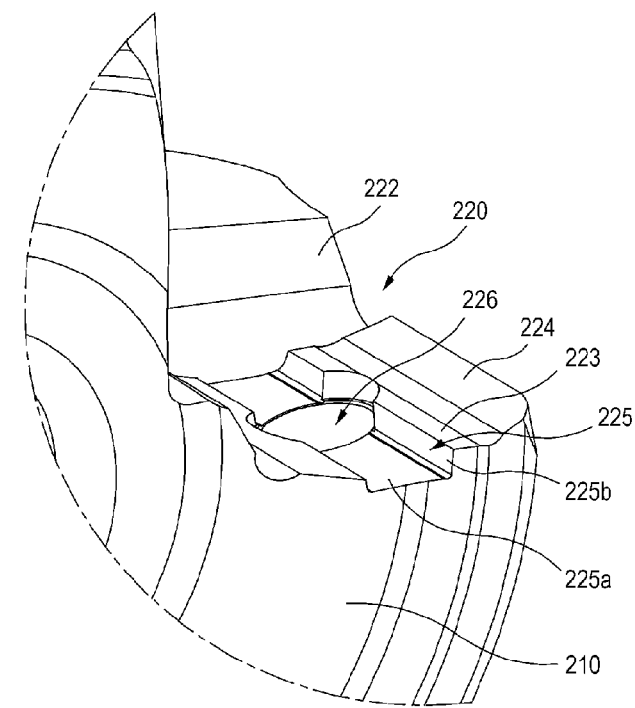
FIG. 11 is a perspective view showing the insert pocket shown in FIG. 10 in another direction.

Referring to FIG. 9, the milling cutter 200 according to an embodiment includes a plurality of the above-described cutting inserts 100 according to an embodiment. Further, the milling cutter 200 includes a cutter body 210 and a plurality of insert pockets 220 provided along the outer periphery of the cutter body 210 at equal spacing. The cutting insert 100 is mounted in the insert pocket 220.

Figure 12:
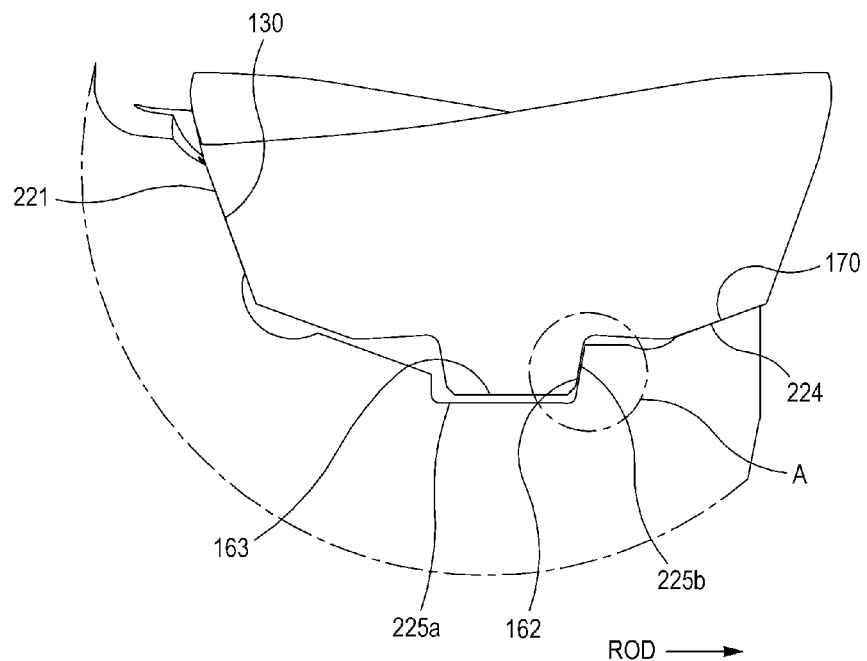
FIG. 12 shows an insert pocket of a milling cutter according to an embodiment and a cutting insert supported by the insert pocket according to an embodiment.

Referring to FIGS. 10 to 13, the insert pocket 220 includes two side walls 221, 222, a base wall 223, a recess portion 225 centrally extending in the base wall 223, and a threaded hole 226 approximately centrally located in the recess portion 225. Further, the insert pocket 220 has relief grooves 227, which receive the edges of the bottom surface 120 of the cutting insert, between the side walls 221, 222 and the base wall 223. Said two side walls 221, 222 support the adjacent two peripheral surfaces 131, 132 of the cutting insert 100 respectively. The base wall 223 has an inclined wall 224, which is located radially outwardly of the insert pocket 220 and protrudes slantingly. When the cutting insert 100 is mounted in the insert pocket 220, the inclined wall 224 supports the lower inclined surface 170 that is located radially outwardly of the insert pocket 220. The recess portion 225 is approximately centrally recessed in the base wall 223. The recess portion 225 includes a bottom wall 225a, a side wall 225b located radially outwardly (e.g., a direction indicated by arrow ROD in FIG. 12), and a side wall 225c located radially inwardly. The recess portion 225 receives the protrusion portion 160 protruding from the bottom surface 120 of the cutting insert 100. The inclined wall 224 is inclined relative to the base wall 223 at the same slope as the slope β of the lower inclined surface 170, so that it can come into surface-to-surface contact with the lower inclined surface 170 as shown in FIG. 12.

Figure 13:
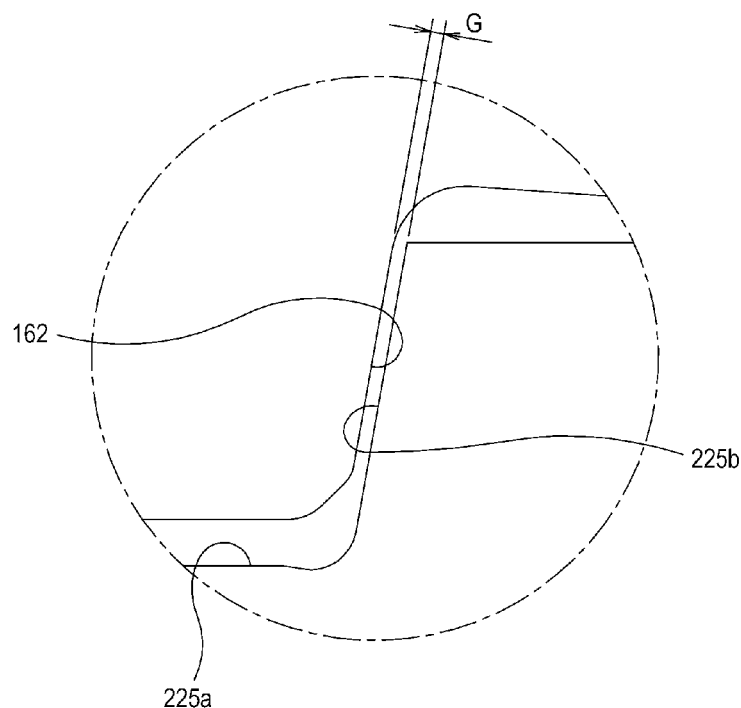
FIG. 13 is an enlarged view showing a portion A of FIG. 12.

As shown in FIGS. 12 and 13, when the cutting insert 100 is mounted in the insert pocket 220 of the milling cutter 200, the recess portion 225 receives the protrusion portion 160 with a gap G between the recess portion 225 and the protrusion portion 160 such that the radially outward lateral surface 162 of the protrusion 161 does not contact the side wall 225b of the recess portion 225 located radially outwardly. Under the state where the gap G exists between the protrusion portion 160 and the recess portion 225, a clamping screw 250 is inserted to the mounting hole 140 of the cutting insert 100 and is then fastened to the threaded hole 226, mounting the cutting insert 100 in the insert pocket 220. If the cutting insert 100 is mounted in the insert pocket 220, two peripheral surfaces 131, 132 of the cutting insert 100, which do not face toward a workpiece, are supported by two side walls 221, 222 of the insert pocket 220 respectively, while one of the lower inclined surfaces 170 of the cutting insert 100 (e.g., the lower inclined surface located radially outwardly of the insert pocket) is supported by the inclined wall 224 of the insert pocket 220. In the state where the peripheral surfaces and the lower inclined surface of the cutting insert 100 are supported as described above, the cutting insert 100 can stably perform general milling operation with low cutting force.

The gap G between the protrusion portion 160 and the recess portion 225 may have various sizes depending on the size of the cutting insert 100 or the milling cutter 200 and the cutting conditions. By way of example, the gap G may be 0.1 mm or less. In the high speed machining and the high ramp machining, the cutting insert 100 is subjected to the radially outward force caused by the centrifugal force and the radially outward cutting force and, then, the cutting insert 100 is minutely displaced in the insert pocket 220. If the gap G is excessively large, then the protrusion portion 160 fails to contact the recess portion 225 in spite of the minute displacement of the cutting insert 100 and thereby the cutting insert 100 cannot be stably retained.

In the high speed machining and the high ramp machining, the cutting insert 100 is subjected to the force acting radially outwardly of the insert pocket 220. By way of an example of the high speed machining and the high ramp machining, the milling cutter 200 may have a size of 30ϕ (the ratio of a diameter to a circumference of a milling cutter). Further, when a force of 5000 N is applied to the clamping screw 250 in its axial direction to clamp the cutting insert 100 to the insert pocket 220 of the milling cutter 200, the gap G between the protrusion portion 160 and the recess portion 225 may be 0.02 mm. Further, the milling cutter 200 may be rotated at the rotation speed of 40000 rpm or more on the condition that the gap G of 0.02 mm exists between the protrusion portion 160 and the recess portion 225. Then, the centrifugal force caused by the high speed revolution of the milling cutter applies a large radially outward force to the cutting insert 100. Then, the protrusion portion 160 is pushed toward the side wall 225b of the recess portion 225 and thus, the lateral surface 162 of the protrusion 161 of the cutting insert 100, which is minutely spaced apart from the side wall 225b of the recess portion 225, comes into contact with the side wall 225b of the recess portion 225. That is, in the high speed machining and high ramp machining, the protrusion portion 160 of the cutting insert 100 comes into contact with the side wall 225b of the recess portion 225 of the insert pocket 220 and is supported by the side wall 225b.

Thus, the radially outward force applied to the cutting insert 100 by the centrifugal force can be effectively absorbed. Further, as such, the radially outward force applied to the cutting insert 100 by the centrifugal force of the milling cutter 200 can be reduced, preventing the breakage of the clamping screw 250, the separation of the cutting insert 100 resulting therefrom, and the damage of the milling cutter 200 further resulting therefrom. Further, the cutting insert 100 and the milling cutter 200 can be stably used in the high speed machining and the high ramp machining. The milling cutter 200 may be rotated at a revolution speed other than that of the above-described example depending on the sizes and shapes of the cutting insert 100 and the milling cutter or depending on the cutting conditions. Further, the size of the gap G existing between the protrusion portion 160 and the recess portion 225 may be determined such that the protrusion portion 160 of the cutting insert 100 can come into contact with the recess portion 225 of the insert pocket 220 when the revolution speed of the milling cutter 200 is equal to or more than a certain revolution speed. As described above, when the cutting insert 100 according to an embodiment is mounted in the insert pocket 220, the protrusion portion 160 of the cutting insert 100 does not contact the recess portion 225. However, as the revolution speed of the milling cutter 200 increases, the lateral surface 162 of the protrusion portion 160, which faces radially outwardly of the insert pocket 220, may selectively come into contact or not come into contact with the side wall 225b of the recess portion 225 located radially outwardly. Accordingly, although the cutting insert 100 according to an embodiment is not manufactured with strict tolerance and high precision, the cutting insert 100 according to an embodiment can be stably used for the high speed machining and the high ramp machining.

While the present invention has been described hereinbefore with reference to the foregoing embodiments depicted in the accompanying drawings, the present invention should not be limited thereto. By way of example, a negative type cutting insert with the above-described protrusion portion in its bottom surface also may be stably mounted and retained in the milling cutter in the high speed machining and the high ramp machining. As such, it will be apparent to those of ordinary skill in the art that various substitutions, alternations or modifications may be made without departing from the scope of the present invention.

The invention claimed is:

1. A cutting insert mountable in an insert pocket of a milling cutter, comprising:
   a top surface;
   a bottom surface;
   a plurality of peripheral surfaces extending between the top surface and the bottom surface;
   a mounting hole extending through the top surface and the bottom surface;
   a plurality of cutting edges formed at intersections between the top surface and the peripheral surfaces;
   a protrusion portion protruding from the bottom surface and extending across the mounting hole, the protrusion portion forming the bottommost portion of the cutting insert in a side view thereof; and
   a pair of lower inclined abutment surfaces provided on opposite edges of the bottom surface, the edges extending along the protrusion portion on either side of the mounting hole, the lower inclined abutment surfaces being inclined in opposite directions toward a pair of opposing peripheral surfaces, outwardly and upwardly relative to the protrusion portion.

2. The cutting insert of claim 1, wherein the plurality of cutting edges comprises a pair of major cutting edges provided in a longitudinal direction of the cutting insert and a pair of minor cutting edges provided in a lateral direction of the cutting insert between the major cutting edges, and
   wherein the major cutting edge is longer than the minor cutting edge.

3. The cutting insert of claim 2, wherein when viewed from top, the major cutting edge and the minor cutting edge adjoin each other with an interior angle of 110 degrees to 130 degrees.

4. The cutting insert of claim 1, wherein the protrusion portion has a shape rotationally symmetrical about a central axis of the mounting hole by 180 degrees.

5. The cutting insert of claim 1,
   wherein the protrusion portion comprises a pair of protrusions separated by the mounting hole, and
   wherein each protrusion comprises:
      a pair of lateral surfaces, each lateral surface facing in a direction of one of the lower inclined abutment surfaces; and
      a flat bottom surface located between the pair of lateral surfaces.

6. The cutting insert of claim 5, wherein the lateral surface of the protrusion has a slope of 0 degree to 15 degrees relative to a direction perpendicular to the bottom surface of the protrusion.

7. The cutting insert of claim 6, wherein when the slope of the lateral surface of the protrusion is 0 degree, the protrusion has a width of ⅓ of a width of the top surface.

8. The cutting insert of claim 5, wherein the lateral surface of the protrusion has a bottom edge chamfered to a beveled or rounded surface.

9. The cutting insert of claim 5, wherein the pair of the protrusions extend in a longitudinal direction of the cutting insert or at an angle to the longitudinal direction of the cutting insert.

10. The cutting insert of claim 5, wherein the pair of the protrusions extend in a wavy shape.

11. The cutting insert of claim 5, wherein the lower inclined abutment surface has a slope of 10 degrees to 30 degrees relative to the bottom surface of the protrusion.

12. A milling cutter, comprising:
    the cutting insert of claim 1;
    a cutter body having a plurality of insert pockets for mounting the cutting insert,
    wherein each insert pocket comprises:
    two side walls supporting adjacent two peripheral surfaces of the cutting insert;
    a base wall having an inclined wall located radially outwardly in the insert pocket and protruding slantingly, the inclined wall supporting a radially outward one of the pair of the lower inclined abutment surfaces of the cutting insert;
    a recess portion recessed in the base wall and receiving the protrusion portion protruding from the bottom surface of the cutting insert; and
    a threaded hole located in the recess portion.

13. The milling cutter of claim 12, wherein the recess portion receives the protrusion portion of the cutting insert with a gap such that the protrusion portion does not contact the recess portion, and
    wherein as a revolution speed of the cutter body increases, the protrusion portion comes into contact with and is supported by a radially outward side wall of the recess portion.

14. The milling cutter of claim 12, wherein the inclined wall of the base wall is inclined relative to the base wall at the same slope as that of the lower inclined abutment surface of the cutting insert.

15. A milling cutter comprising:
a cutter body having an least one insert pocket; and
the cutting insert of claim 1 mounted in the at least one insert pocket.

16. The milling cutter of claim 15, wherein:
the cutting insert's protrusion portion has a lateral surface facing in a radially outward direction of the milling cutter;
the lateral surface does not contact the insert pocket when the milling cutter is not rotating; and
the lateral surface contacts the insert pocket only when the milling cutter rotates at a sufficiently high speed.

17. The milling cutter of claim 15, wherein:
the at least one insert pocket comprises:
first and second pocket side walls;
a pocket base wall having an inclined wall located radially outwardly in the insert pocket;
a recess portion formed in the pocket in the base wall, the recess portion having a recess portion bottom wall and a radially outward side wall; and
a threaded hole located in the recess portion bottom wall; and
the cutting insert is mounted in the at least one insert pocket with:
the cutting insert's protrusion portion received into the recess portion without contacting the recess portion's radially outward side wall;
the first and second pocket side walls supporting adjacent first and second peripheral surfaces of the cutting insert; and
the inclined wall of the insert pocket's base wall supporting one of the pair of the lower inclined abutment surfaces of the cutting insert.

18. The milling cutter of claim 17, wherein the inclined wall of the base wall is inclined relative to the base wall at the same slope as that of the lower inclined abutment surface of the cutting insert.

19. The milling cutter of claim 18, wherein
the protrusion portion has a bottom surface; and
each of the lower inclined abutment surfaces has a slope of 10 degrees to 30 degrees relative to the bottom surface of the protrusion portion.

20. The cutting insert of claim 1, wherein:
the protrusion portion has a bottom surface; and
each of the lower inclined abutment surfaces has a slope of 10 degrees to 30 degrees relative to the bottom surface of the protrusion portion.

* * * * *